United States Patent
Kejha

[19]

[11] Patent Number: 6,134,773
[45] Date of Patent: Oct. 24, 2000

[54] METHOD FOR AUTOMATIC MASS PRODUCTION OF ELECTROCHEMICAL CELLS

[75] Inventor: Joseph B. Kejha, Meadowbrook, Pa.

[73] Assignee: Lithium Technology Corporation, Plymouth Meeting, Pa.

[21] Appl. No.: 09/027,037

[22] Filed: Feb. 20, 1998

[51] Int. Cl.⁷ ...................................................... H01M 6/00
[52] U.S. Cl. .......................... 29/623.3; 29/730; 29/623.1; 29/623.5
[58] Field of Search ............................... 29/623.1, 623.3, 29/730, 623.5

[56] References Cited

U.S. PATENT DOCUMENTS 5,443,602  8/1995  Kejha .................. 29/623.1 X

*Primary Examiner*—John S. Maples
*Attorney, Agent, or Firm*—Zachary T. Wobensmith, III

[57] ABSTRACT

Method for automatic mass production and packaging of electrochemical cells where a current collector web with attached masked terminals is rolled onto a spool, which spool is placed in a cathodic coating machine where the web is pulled through a dip tank for coating and then pulled vertically through a solidification tower, the terminals are unmasked, an insulating plastic net is provided in an electrolyte coating chamber where it is pulled through a dip tank filled with liquid polymer electrolyte, and is laid on top of the cathode web while still wet and tacky, and then travels through a solidification chamber after which an adhesive tape carrying leaf anodes is laid on top, pressed together to form cell assemblies which are cut between the anode leafs to prevent shorting and, to form individual cell assemblies, which are picked up, stacked into multiple packs, heat sealed in a plastic coated metal foil bag which is inserted into a hard casing. Similar but expanded apparatus and methods for mass production of bi-cells or bi-polar batteries are also described, where the anode carrying tape is omitted and additional layers are added to form bi-cells or bi-polar electrochemical devices. The configuration of the cell assemblies may be reversed with single cells having the anode with electrolyte layer on the bottom, and leafs of cathodes on top with adhesive tape retaining and protecting them, the reverse bi-cell assemblies have two anode layers with electrolyte layers on the bottom and top with leafs or cathode inserted therebetween. The operations may take place in an inert environment.

8 Claims, 10 Drawing Sheets

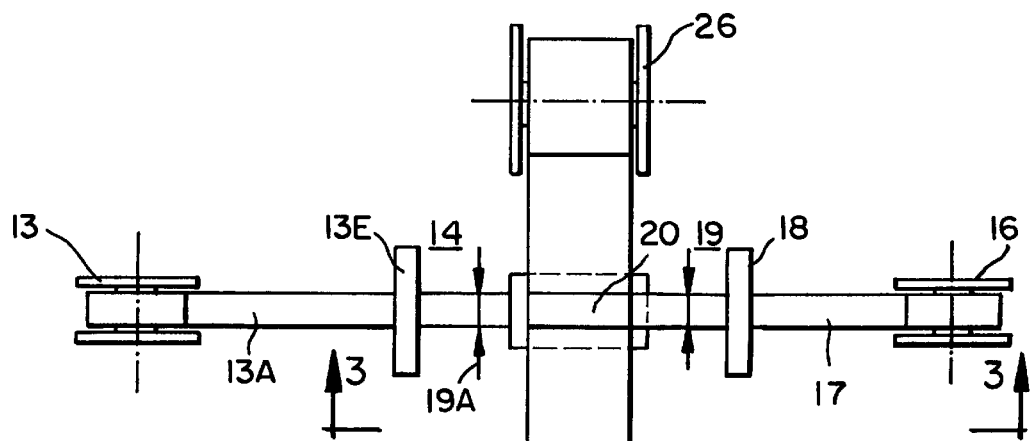
FIG. 2
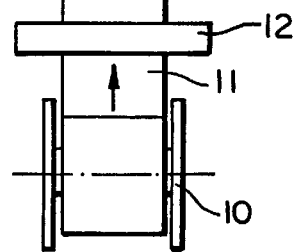
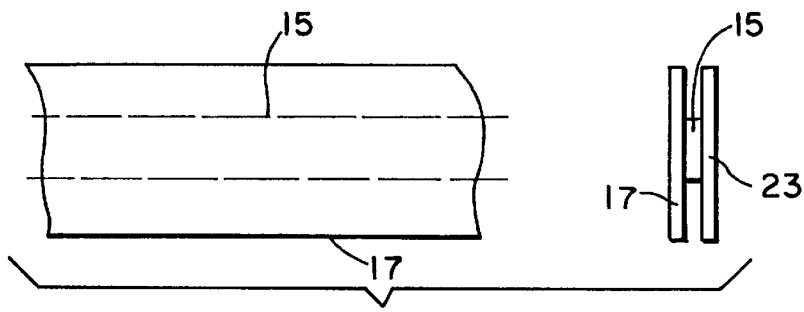
FIG. 2B
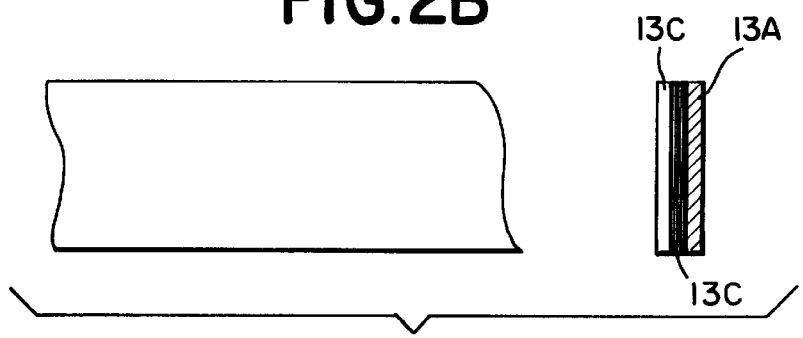
FIG. 2C

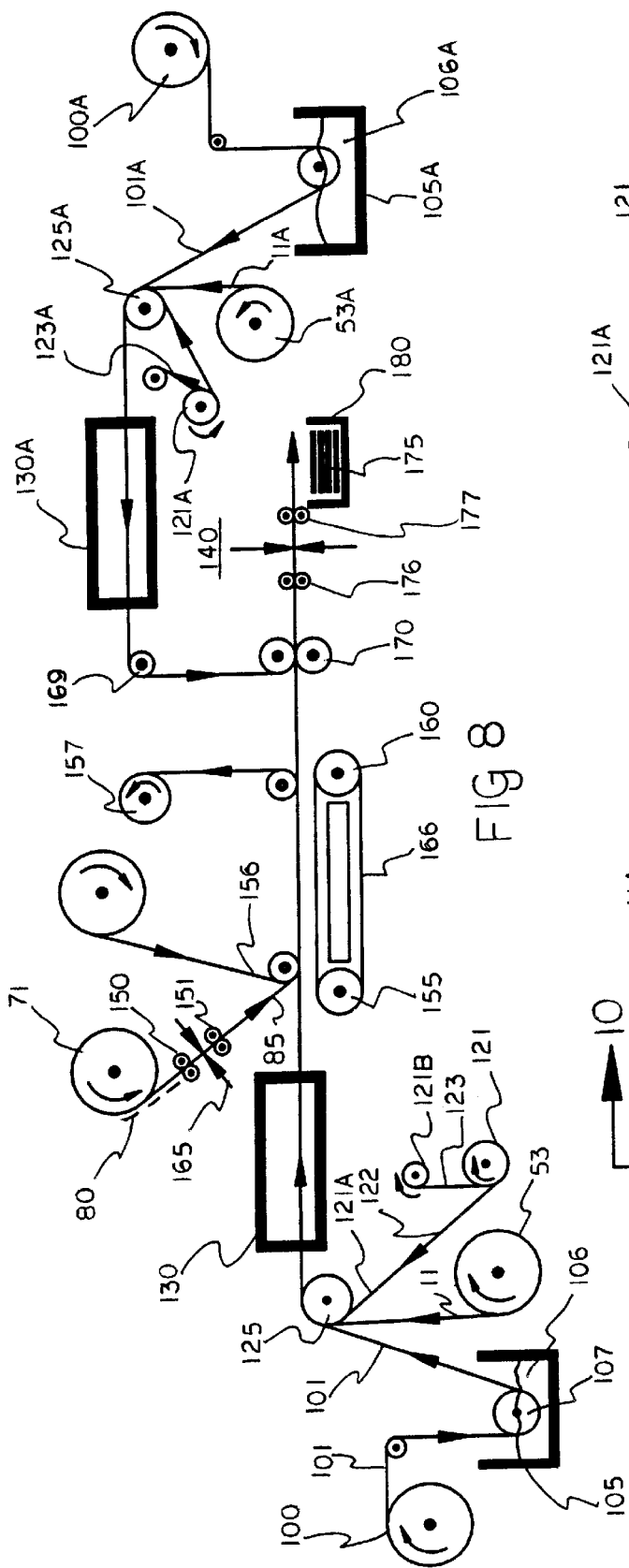
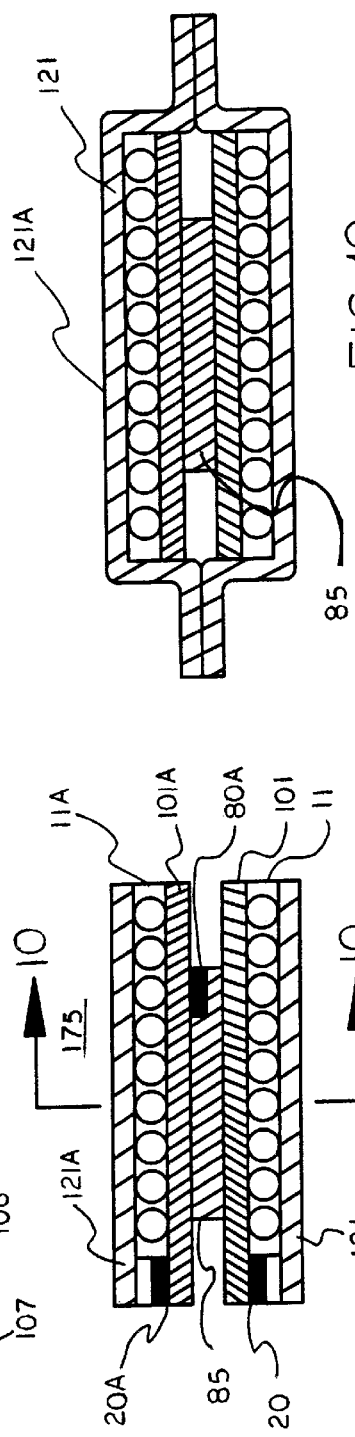
FIG 8
FIG 10
FIG 9

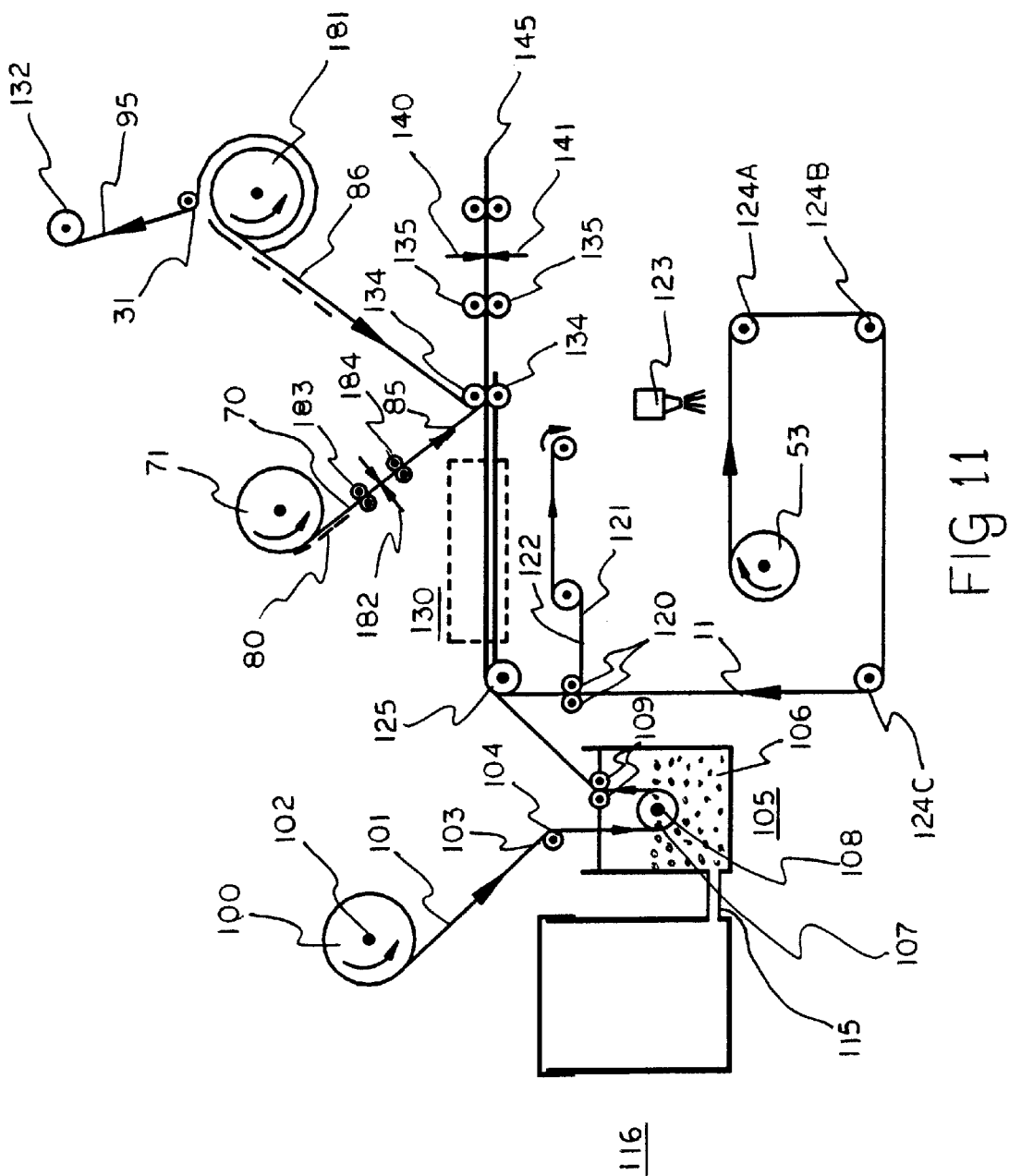

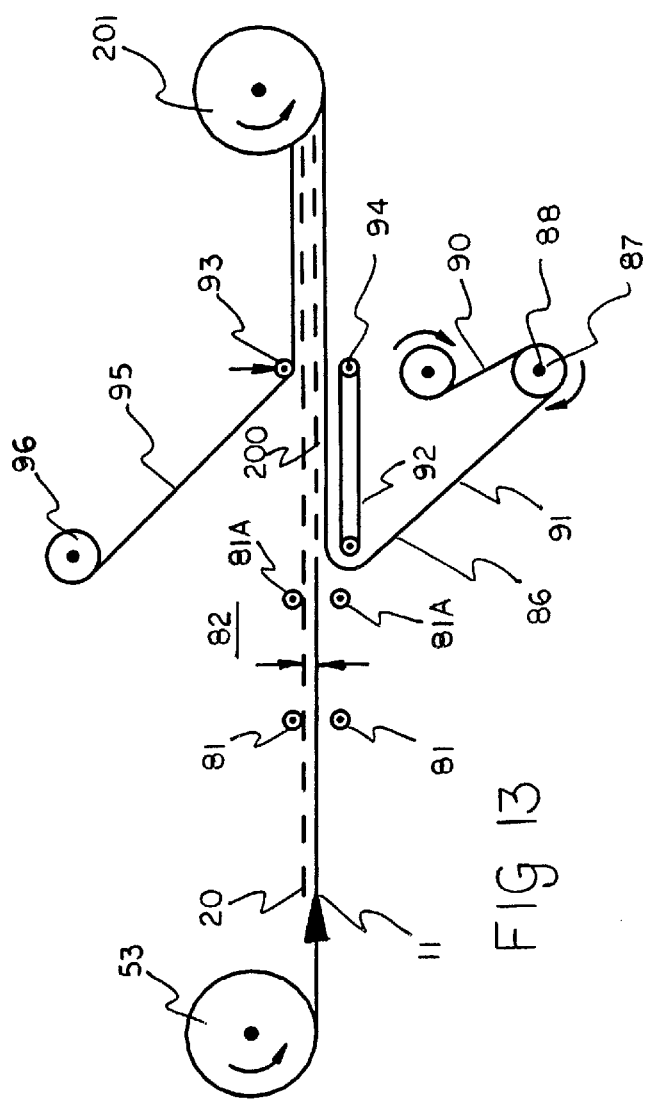
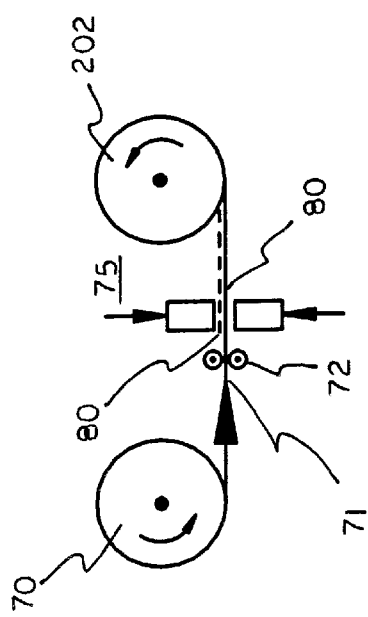
FIG 13
FIG 13A

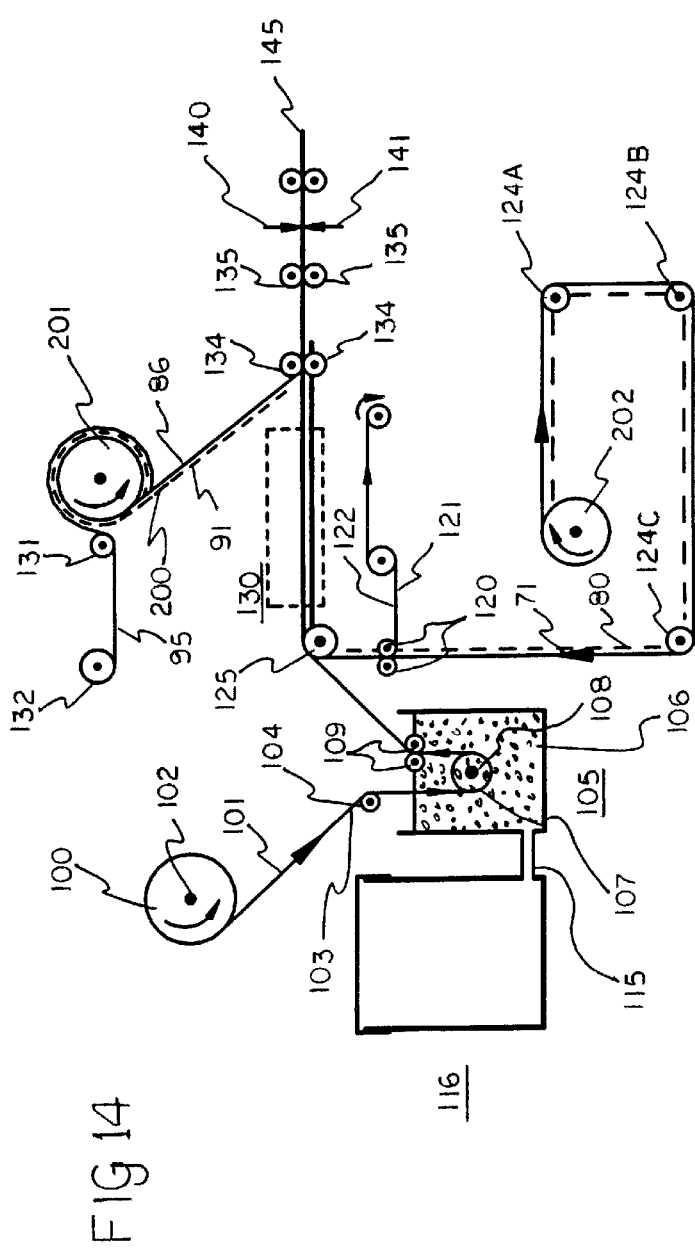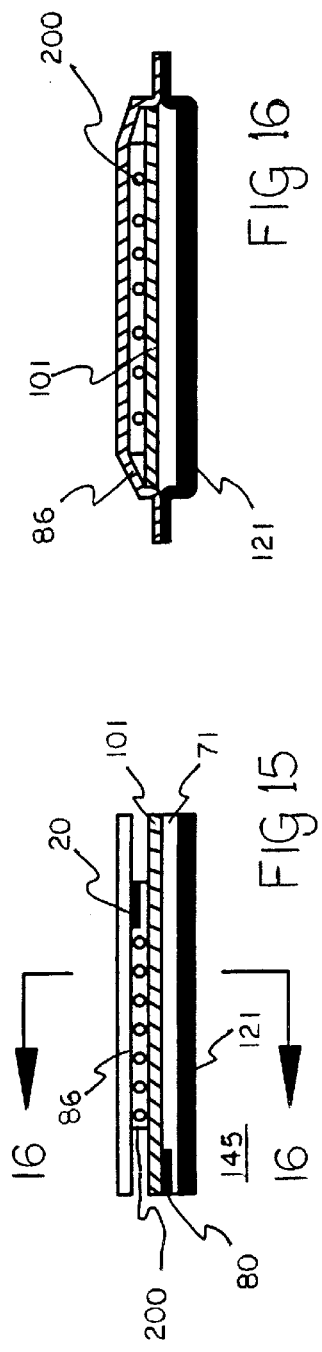

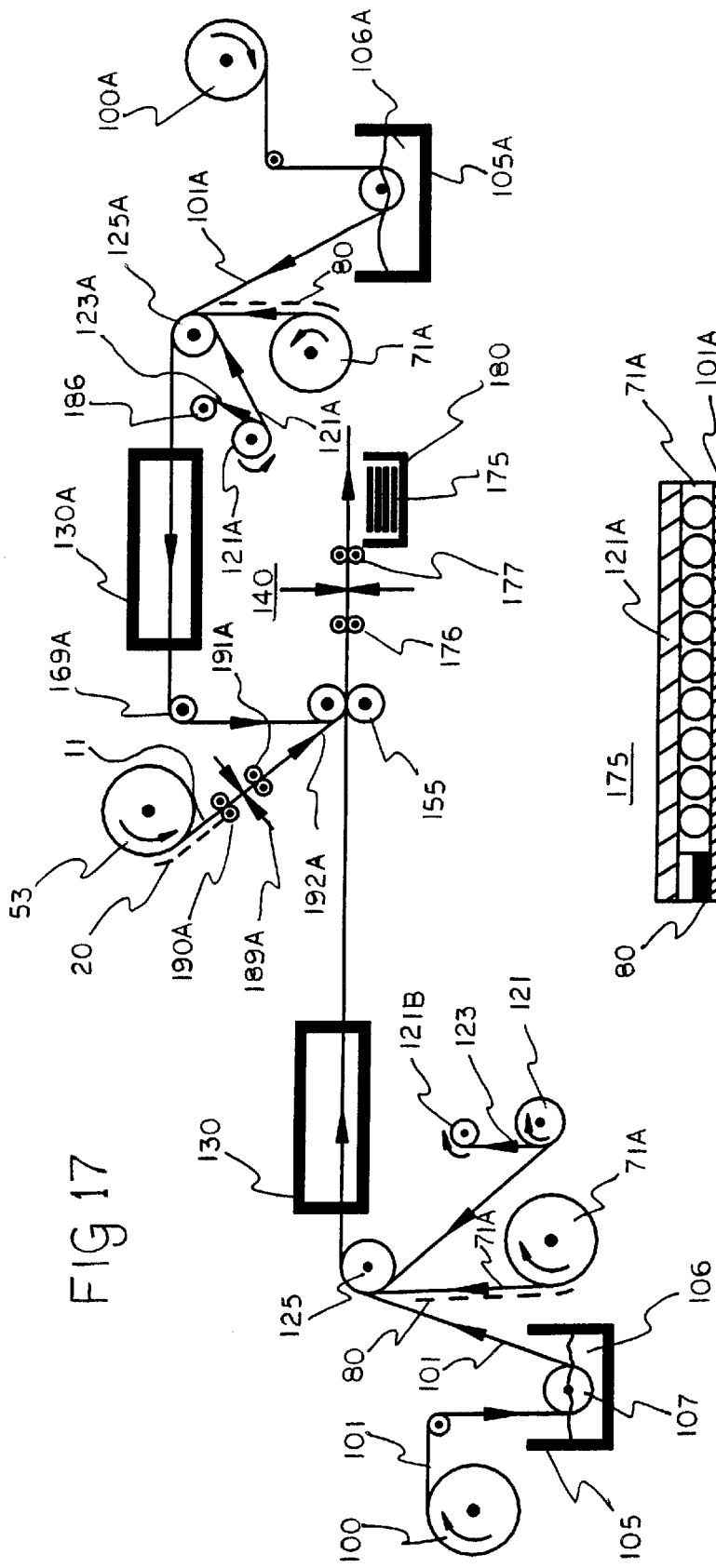

METHOD FOR AUTOMATIC MASS PRODUCTION OF ELECTROCHEMICAL CELLS

The subject matter of this invention is shown and described in the Disclosure Document of Joseph B. Kejha, Ser. No. 393428, filed on Feb. 21, 1996.

BACKGROUND OF THE INVENTION

1. Field of the Invention

This invention relates to a method for automatic mass production and packaging of electrochemical cells, where cathodes and leaf anodes with attached terminals are carried on webs or adhesive tapes which are rolled onto spools. An insulating plastic net from a spool is placed in an electrolyte coater, unrolled, and the web is pulled through a tank where it is coated with a liquid polymer electrolyte, the electrolyte-coated net and a cathode web are joined, the assembly is solidified, and a top tape with leaf anodes is placed thereon, pressed together, and the assembly is cut between anodes to form single cell assemblies, which are stacked, heat sealed in a moisture proof metal foil bag and placed in a hard container. The method is also used to produce reversed assemblies of single cells where the anode is on the bottom and leafs of cathode are placed on adhesive tape on top of and are joined to the electrolyte. The leafs of anodes or cathodes are also optionally cut before assembly and in synchronized manner deposited on top of the electrolyte, and then covered by an adhesive top tape, to prevent accumulation of tolerances and misalignment.

This invention also relates to a similar but extended method for automatic mass production of bi-cells or bi-polar batteries where the top adhesive tape is omitted and This invention also relates to a similar but extended method for automatic mass production of bi-cells or bi-polar batteries where the top adhesive tape is omitted and additional layers are added to form bi-cell assemblies and/or bi-polar electrochemical devices.

2. Description of the Prior Art

In the manufacture of electrochemical devices it is necessary to carefully control the quality and uniform thickness of the finished product. Electrochemical devices such as batteries and fuel cells, and particularly lithium metal batteries, consist of an assembly of at least a cathode layer, an electrolyte layer, an anode layer and terminals. The prior art devices often suffered from variable thickness, non-uniform composition or dispersion of chemicals, dendrite formation, shorting, and other quality control problems. The prior art manufacturing methods involved forming the cathode by extruding or extrusion-coating of cathode material on top of a current collector, and forming the electrolyte by extrusion coating of a polymer on top of the cathode material. The thickness and uniformity of both layers are difficult to control, and the width is limited.

My prior U.S. Pat. No. 5,443,602 describes apparatus for assembling single and bi-cell assemblies but with some applications does not operate satisfactorily to prevent stretching of the tapes and misalignment of the components.

The present invention uses a composite electrolyte construction of uniform thickness, and unlimited width. As the composite electrolyte has a web of insulating net embedded in ion-conductive polymer, the structure does not short, and is highly ion-conductive. The composite cathode of the invention has a net of carbon fibers, or other conductive fibers embedded in the cathodic material, and the current is collected from inside, which is more efficient. The structure is of uniform thickness, and unlimited width by nature of the process. The anode may have similar composite construction and benefits as the cathode, except that the electrically conductive fibers are embedded in an anodic material or a carbon matrix. In the present method, the short-comings of the prior art are overcome and many advantages are obtained.

SUMMARY OF THE INVENTION

It has now been found that a mass production packaging method for automatic assembling and packaging of electrochemical cells is available where a spool of current collector with attached terminals is coated with anode material, or it may be a metal foil anode, and a spool of insulating plastic net such as described in the U.S. Patent of Joseph B. Kejha and Stephen F. Hope, U. S. Pat. No. 5,521,023 and U.S. Pat. No. 5,102,752 which is fed into liquid electrolyte, laid on and joined to the anode, solidified, and while still tacky it is joined with an adhesive tape web from a spool, which tape carries spaced leaf cathodes having a current collector coated with cathodic material and terminals attached thereto. The assembly is fed into an optional cutter and cut between cathode leafs to form individual single cells. The leaf cathodes may also be cut before assembly and deposited in synchronized manner on top of the solidified electrolyte, to prevent accumulation of tolerances and misalignment, and then covered by the adhesive tape. The resulting assembly is then cut between the cathode leafs into individual cells. Cutting between the leafs prevents shorting of the cells. The cells are then stacked and heat sealed in a metal foil bag, which is inserted into a hard casing.

To produce bi-cells, the adhesive tape of the cathodes is omitted, and instead individual cathode leafs with terminals are optionally cut and fed on top of a solidified first composite electrolyte layer, which is on top of an anode layer. Then, the continuous web of second current collector which was coated with an anode material, (or it may be a metal foil anode), is joined with a continuous second layer of composite electrolyte on top thereof, and is pressed on top of the cathodes by rollers in a mirror image process of the first current collector and first composite electrolyte layers, ending in upside down position as compared to the first two layers, and with the electrolyte layer facing towards the cathodes. The assembly is fed into an optional cutter and cut preferably between the cathodes to form individual bi-cells. Similarly, additional layers may be inserted to form bi-polar batteries or fuel cells. The second current collector coated with anode material, (or the second metal foil anode), with second composite electrolyte, may also be cut before assembly and deposited in a synchronized manner on top of the cathode leafs to prevent accumulation of tolerances and misalignment. Then the assembly is cut again, between the cathode leafs to prevent shorting of the cells. Identical methods may be used for production of single, double, or multiple capacitors, except that the anode and cathode are replaced with two electrodes. If the assemblies are not cut, they may be rolled into "jelly roll" cells.

The principal object of the invention is to provide a method for economical automatic mass production packaging of assemblies of single and bi-cell electrochemical cells or capacitors, which provides products of uniform high quality and consistency, which are highly ion-conductive, resist shorting, are dendrite-proof, and have high capacity.

It is a further object of the invention to provide a method of the character aforesaid which is fast and economical, and which reduces the risk of contamination and shorting of the electrochemical devices.

Other objects and advantageous features of the invention will become apparent from the accompanying description and drawings.

DESCRIPTION OF THE DRAWINGS

The nature and characteristic features of the invention will be more readily understood from the following description taken in connection with the accompanying drawings forming part hereof in which:

FIG. 2B is an end view of a portion of the apparatus of FIG. 3;

FIG. 2C is an end view of a portion of the apparatus of FIG. 3;

FIG. 2 is a top plan view of an apparatus used to apply terminals to a cathode current collector web;

FIG. 8 is a diagrammatic view of an apparatus which produces bi-cell assemblies;

FIG. 9 is a vertical sectional view of the bi-cell product of FIG. 8;

FIG. 10 is a vertical sectional view taken approximately on the 10—10 of FIG. 9;

FIG. 11 is a view similar to FIG. 1 and which has an additional cutter;

FIG. 13 is a diagrammatic view of an apparatus which illustrates cathode manufacture;

FIG. 13A is a diagrammatic view showing attachment of terminals to anode material;

FIG. 14 is a diagrammatic view of a single cell reverse apparatus;

FIG. 15 is a vertical sectional view of a final reversed single cell product;

FIG. 16 is a vertical sectional view taken approximately on the line 16—16 of FIG. 15;

FIG. 17 is a diagrammatic view of a reverse bi-cell apparatus, and

FIG. 18 is a vertical sectional view of a final reversed bi-cell product.

It should, of course, be understood that the description and drawings herein are merely illustrative and that various modifications and changes can be made in the structures disclosed without departing from the spirit of the invention.

Like numbers refer to like parts throughout the several views.

DESCRIPTION OF THE PREFERRED EMBODIMENTS

When referring to the preferred embodiments, certain terminology will be utilized for the sake of clarity. Use of such terminology is intended to encompass not only the described embodiment, but also technical equivalents which operate and function in substantially the same way to bring about the same result.

Figure 3:
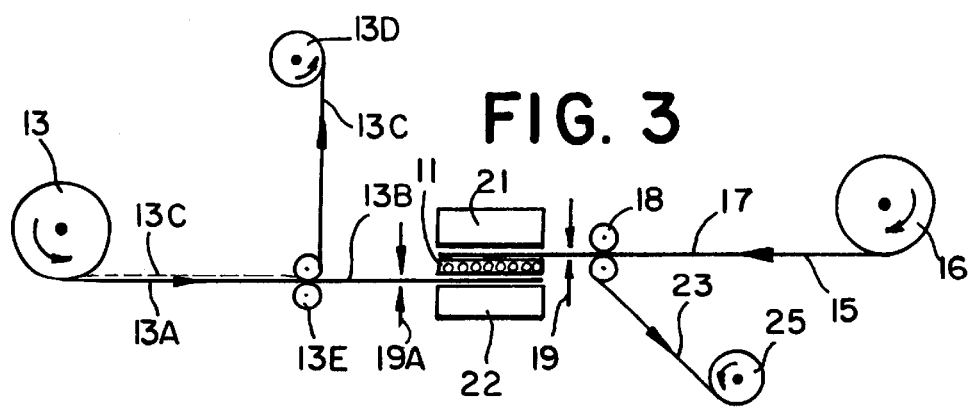
FIG. 3 is a vertical sectional view taken approximately on the line 3—3 of FIG. 2.

Referring now more particularly to FIGS. 2, 2B, 2C, 3, 4 and 5 of the drawings an apparatus for the manufacture of cathode portions of electrochemical devices, and particularly for lithium metal batteries is illustrated. The apparatus as shown in FIGS. 2 and 3 includes a spool 10 which may carry a length of carbon fiber non-woven fabric web 11 such as described in U.S. Pat. No. 4,960,655 or other desired current collector such as described in the application of Joseph B. Kejha, Ser No. 08/281,011 filed Jul. 27, 1994. The web 11 is fed by roller 12 to terminal attaching station 14.

A length of metal foil, such as nickel foil 15, is wound on spool 16, which foil is perpendicular to web 11. The foil 15 has top pressure sensitive masking tape 17 thereon, which is wider than foil 15, and is fed by rollers 18 through a cutter assembly 19 onto the web 11, which cutter cuts the foil 15 into terminals 20, preferably after deposition on top of the web 11 in spaced relation, and are pressed thereon by press blocks 21 and 22.

The positioning of the web 11 and the nickel foil 15 is synchronized so that the terminals 20 are spaced apart the required distance and cut to uniform length, which may be longer than the width of web 11.

The foil 15 may have a length of release tape 23 thereon, which is removed as the foil 15 passes between rollers 18 prior to cutting, and is taken up by roller 25.

A bottom tape feed station as shown in FIGS. 2, 2A, 2C and 3 may be added. The bottom tape 13A on spool 13 has a pressure sensitive adhesive layer 13B facing the bottom of the current collector web 11, and may have a length of release tape 13C which is taken up by spool 13D. The bottom tape 13A is fed under the web 11 by rollers 13E, preferably simultaneously with foil 15, and is pressed into web 11 by blocks 21 and 22, and is cut by cutter assembly 19A, preferably at the same time as cutter 19. The bottom tape 13A grabs the terminals 20 through the net holes of the web 11, and joins the web 11 and terminals 20 in electroconductive contact, as described in the Patent Application of Stephen F. Hope and Joseph B. Kejha, Ser. No. 08/233,401 filed Apr. 26, 1994. The top masking tape 17 reinforces the attachment, a part, or all of the tape 17 is later removed in demasking device 52.

The foil 15 may also have masking tape 17 on top, and the bottom tapes 13 and 13A omitted, and instead have its bottom rough surface coated with a solder metal, such as indium, tin, lead or lithium, or their alloys. The foil 15, after deposition on web 11 as described above may be pressed by heated or cold blocks 21 and 22, which will cause the solder to flow into the net holes of web 11, encapsulating the web 11, and if heated, cooling will cause the web 11 to be joined to foil 15, or terminal 20 in electroconductive contact.

The web 11 with attached terminals 20 is then rolled onto a spool 26, and further processed if desired.

Figure 4:
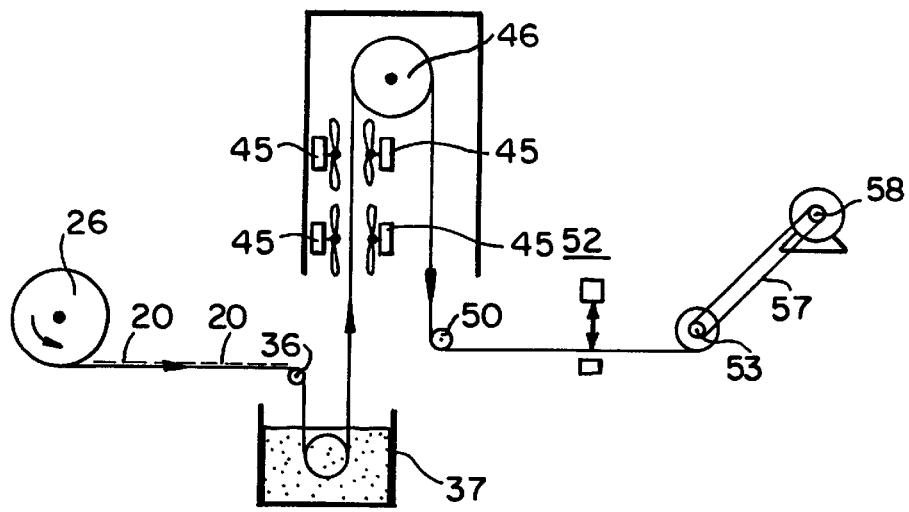
FIG. 4 is a diagrammatic view of an apparatus used to coat the cathode web of FIG. 2 with cathodic material.
Figure 5:
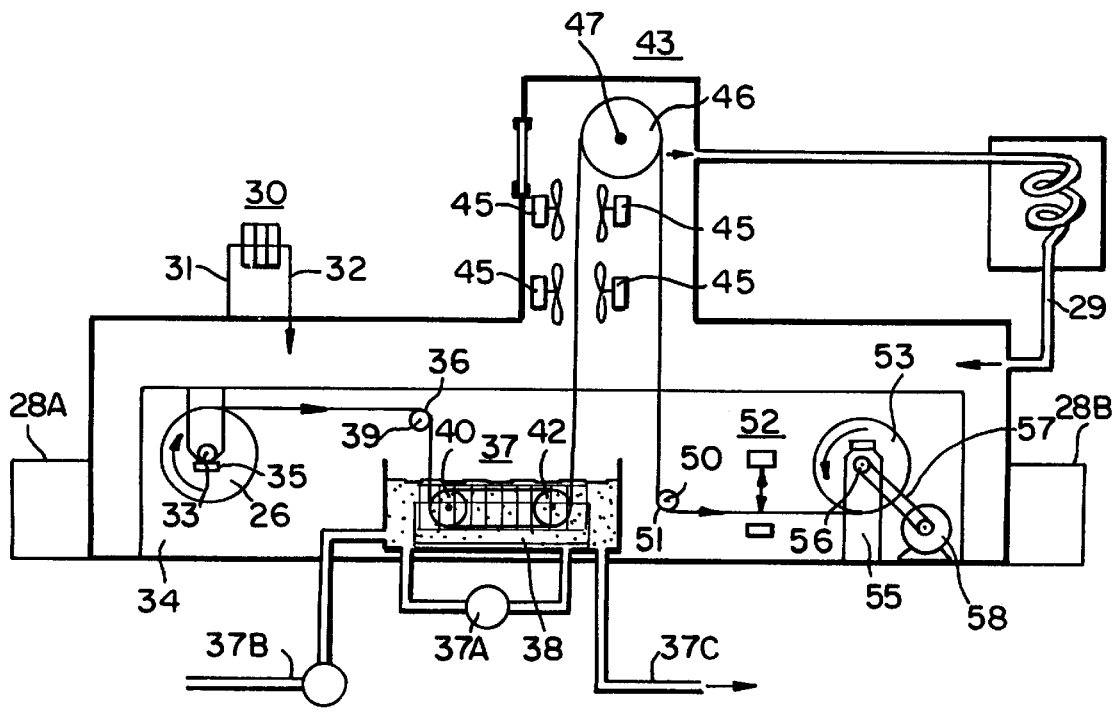
FIG. 5 is a view similar to FIG. 4 but with additional structure.

Referring now to FIGS. 4 and 5, if alkali metal or other electrochemical devices are to be produced, the spool 26 is placed in a box 27 through antechamber 28A. The box 27 may have a controlled and preferably inert atmosphere, and preferably an argon gas atmosphere which is supplied through pipe 29. The box 27 has a blower and filter 30 of well known type which constantly removes the atmosphere through pipe 31, removes the oxygen, nitrogen, hydrogen and other impurities and recirculates argon back through pipe 32 to box 27.

The spool 26 is carried on shaft 33 in frame 34, which has a friction brake 35 thereon, for the controlled unwinding of web 11. Web 11 travels over roller 36 down into a dip tank 37, which contains a liquid mixture of cathode material 38 and solvent, or a liquid, or a mixture of cathodic material with a liquid polymer electrolyte of well known type. The roller 36 is carried on shaft 39 in frame 34. The web 11 from roller 36 travels under roller 40, which is carried on rack 41 and under roller 42, which is also carried in rack 41, and is coated and encapsulated by mixture 38. The web 11 from roller 42 travels vertically upwardly through a vertical chimney or solidification chamber 43. As it travels, the web 11 is preferably dried by infrared heaters with fans 45, or solidified by other means, and goes over a top roller 46 in chimney 43, by which time the solvent has evaporated and the cathodic material 38 has bonded to the web 11, and dried or has solidified before it touches the upper roller 46. The roller 46 is on shaft 47 which is carried in dryer 43 for free rotation.

The evaporated solvent from the cathodic material may be removed from chamber 43 by pipe 48, separated from the argon in a condenser 49, and reused with another mix of cathode material in a reservoir (not shown).

In the production of non-alkali metal electrochemical devices, the box 27 may be omitted.

The dip tank 37 has a recirculating pump 37A which constantly recirculates the liquid cathode material 38. The tank 37 may also be connected to a reservoir (not shown) by pipes 37B and 37C with a viscosity monitor (not shown) in tank 37 which controls the viscosity of the material supplied thereto.

The web 11 travels downwardly from the roller 46 under roller 50 which is on shaft 51 carried in frame 34. The terminals 20 are partially or fully unmasked by an unmasker device 52 of well known type, which removes sections or all of the masking tapes 17 from the terminals 20. The web 11 is taken up by a removable driven spool 53 which has a shaft 54 carried in bracket 55 with pulley 56 thereon which is driven by belt 57 or chain or other means (not shown) from motor 58 which is mounted to floor 60. Spool 53 may be stored in a sealed cassette (not shown) and may be moved into and out of box 27 through antechamber 28B.

Figure 6:
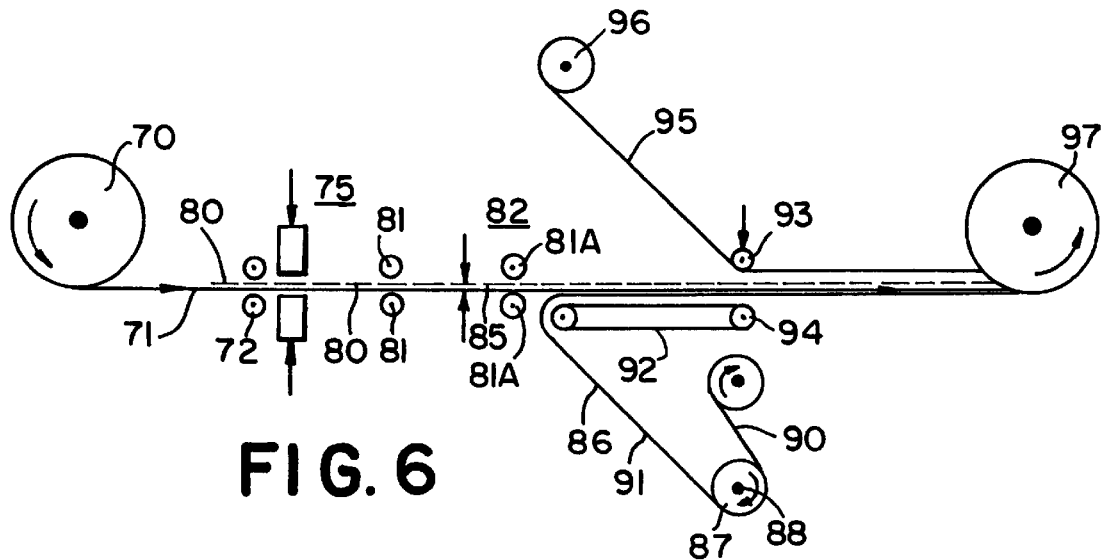
FIG. 6 is a diagrammatic view of an apparatus for manufacturing leaf anodes.
Figure 7:
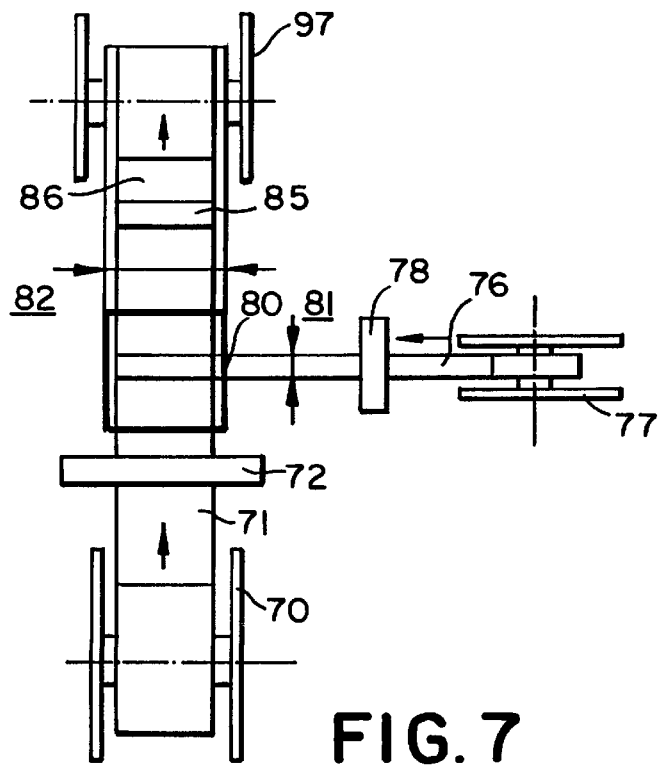
FIG. 7 is a top plan view of a portion of the apparatus of FIG. 6.

Referring now more particularly to FIGS. 6 and 7 of the drawings the apparatus for manufacturing the anode components of single cell electrochemical devices is illustrated, and which may be located in a controlled inert atmosphere. A spool 70 is provided which has a length of anodic material 71 wound thereon, which may be lithium metal foil or other desired suitable metal alloy foil.

The foil 71 as it unwinds from spool 70 is carried by rollers 72 to a terminal attaching station 75.

A length of terminal material 76 of well known type, such as nickel foil with a rough surface (not shown) facing the anodic material, is carried on a spool 77, which length is perpendicular to foil 71 and as it is unwound is carried by rollers 78 to the terminal attaching station 75, and onto foil 71.

The terminal material 76 is cut into terminals 80 by a cutter assembly 81 of well known type.

The terminals 80 are deposited one at a time on the foil 71, with the positioning of the foil 71 and the terminal material 76 synchronized, so that terminals 80 are deposited at spaced locations on foil 71. As required, the terminals 80 are attached in station 75 by pressing the rough surface (not shown) of terminals 80 against the foil 71 which cold solders the terminals and the foil together.

It should be noted that, if a carbon coated current collector web is used for the anode such as in lithium-ion batteries, fuel cells or other batteries and electrochemical devices, then instead of foil 71 the terminals are attached in the same manner as described in the cathodic manufacture above of FIGS. 2 and 3, but the web is optionally cut into leaves similar to leaves 85. The carbon coated current collector web with described terminal attachment may also be used in capacitor and fuel cell manufacturing.

The anode foil 71 with attached terminals 80 is carried by rollers 83 to and passes between an optional cutter assembly 82, which may contain a laser cutter, where it engages rollers 81A, which assembly 82 then cuts the foil into leaf anodes 85 between terminals 80, which are then deposited on a length of adhesive tape 86, which should be wider than anode foil 71 and webs 11 and 101. The foil 71 is fed from a roll 87 carried on a spool 88 underneath the leaf anodes 85. The adhesive tape 86 has a length of release paper 90 removed therefrom so that as spool 88 unwinds the adhesive side 91 faces upwardly to receive and retain the leaf anodes 85, as described in the Application of Stephen F. Hope and Joseph B. Kejha, Ser. No. 08/281,014 filed on Jul. 27, 1994 and in U.S. Pat. No. 5,006.554.

The tape 86 is carried on an optional belt 92 to nip rollers 93 and 94 with a length of release paper or tape 95 from spool 96 introduced above the leaf anodes 85, and below roller 93 where they are pressed together with both tapes being taken up by a driven spool 97 about which they are wound.

Figure 1:
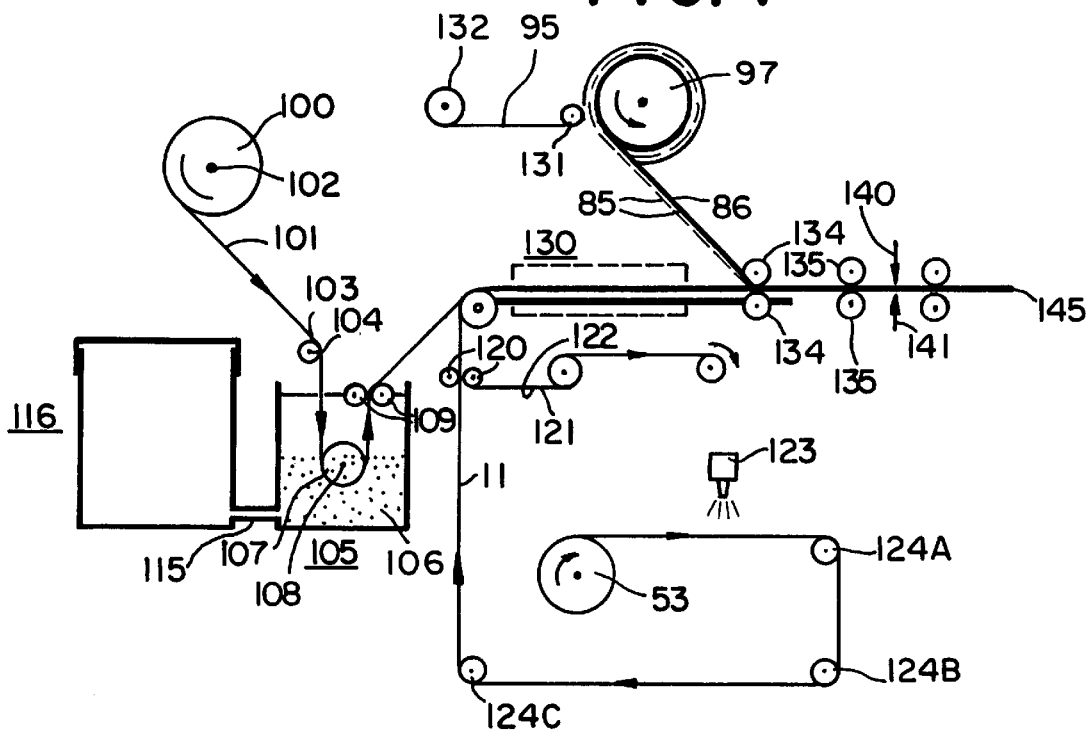
FIG. 1 is a diagrammatic view of an apparatus which assembles and packages single cell electrochemical devices in accordance with the method of the invention.

Referring now additionally to FIGS. 1. 1A and 1B, the assembly apparatus is therein illustrated and includes a spool 100 with a net web of insulating plastic 101 wound thereon in a box (not shown) which can be an extension of box 27 described above, or a separate box (not shown). The spool shaft 102 is engaged in a frame (not shown) for controlled unwinding. The web 101 from spool 100 extends down over roller 103 with its shaft 104 carried in a frame (not shown) and down into a dip tank 105 which is filled with a polymer electrolyte 106 in liquid state, which may be a hot melt. The web 101 extends under roller 107 on shaft 108, carried by tank 105, and travels upwardly between partially submerged optional wipe rollers 109 which control the thickness of the electrolyte on the web 101, and the web 101 is coated and encapsulated by the electrolyte.

The dip tank 105 may be connected by pipe 115 to a supply reservoir 116 of electrolyte to maintain the proper temperature and level of electrolyte.

The cathode spool 53 with coated web 11 and attached terminals 20 is also located in the assembly apparatus. The cathodic material coated web 11 is unrolled from spool 53 and travels upwardly between rollers 120, where an adhesive plastic tape 121 is joined thereto. The tape 121 has an adhesive covered side 122 which faces the web 11 and the tape is wider than the cathode and electrolyte webs 11 and 101. The adhesive may also be a polymer electrolyte. The adhesive tape 121 may also have a release paper or tape thereon which unwinds (not shown). If desired the cathode coated web 11 may optionally be moisturized with a liquid electrolyte by spraying, preferably with an ultrasonic sprayer 123, before assembly and then travels over rollers 124A. 124B and 124C.

The electrolyte web 101 is engaged from underneath by the cathode web 11 and both extend over a preferably large diameter roller 125 where they are forced together by tension forces in the webs 11 and 101. The webs 11 and 101 then travel through an optional solidification chamber 130 of well known type, such as a cooling or radiation cross linking chamber where the liquids solidify, but remain tacky. Any vaporized solvent from the electrolyte may be collected in a similar condenser, as described for cathode coating (not shown).

The anode leaf carrying tape 86 which is wider than anode leaves 85, and may be the same width as tape 121 is unwound from spool 97 and laid down on top of the web 11. As the tape 86 unwinds, the release paper 95 is unwound, extends over roller 131 and is taken up by spool 132, exposing the adhesive portion of tape 86 which faces the web 11. The tape 86, webs 11 and 101 pass in preferably synchronized relation between a pair of soft squeegee rollers 134, which assemble them by pressure, after which they are engaged by a second pair of rollers 135 which deliver the layered assembly to an optional cutter station 140 for cutting, if desired. The cutter station 140 may include one or more blades 141, which are preferably of plastic or ceramic composition, or the station 140 may contain a laser cutter (not shown).

Figure 1A:
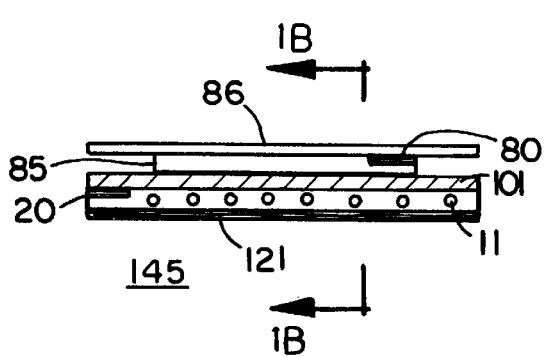
FIG. 1A is a vertical sectional view of a single cell product of FIG. 1.
Figure 1B:
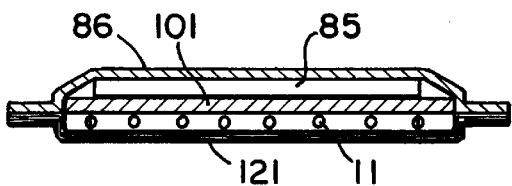
FIG. 1B is a vertical sectional view taken approximately on the line 1B—1B of FIG. 1A.

The blades 141 cut the layer assembly preferably between the leaf anodes 85 to prevent shorting, and to form individual cells 145 as shown in FIGS. 1A and 1B. The cells 145 are preferably picked up by a vacuum arm (not shown) of well known type, stacked with terminals connected as required, placed into a heat sealable metal foil bag coated with a plastic (not shown) which is heat sealed, and then placed in a hard container (not shown) for puncture protection as described in the U.S. Patent of Stephen F. Hope and Joseph B. Kejha, U.S. Pat. No. 5,422,200.

It should be noted that top and bottom tapes 121A and 121 may have side strips without adhesive and thus may be joined by heat sealing/welding by passing through a pair of spool shaped hot rollers (not shown).

If the option al cutter station 140 is omitted, the layered assembly may be rolled into a "jelly roll" cell or cells by winding device (not shown), with terminals 10 and 80 connected as desired, and then sealed.

Referring now more particularly to FIGS. 8 and 9 of the drawings, the apparatus for assembly of bi-cells is illustrated.

The apparatus is similar to the apparatus of FIG. 1, which may also be in a box with controlled inert atmosphere, in that a spool 100 with a net web of insulating plastic 101 is provided, which extends over roller 107 into dip tank 105, which is filled with polymer electrolyte 106 in liquid state. A spool 53 with a cathode coated web 11 which has unmasked terminals 20 thereon and may also be pre-moistened as described, extends to and meets web 101 at a roller 125. A spool of bottom plastic tape 121 is optionally provided, with adhesive 122 facing the web 11, which tape 121 is wider than web 11, and which is underneath of web 11 and has release paper or tape 123, which is wound onto a spool 121B as tape 121 unwinds. The tape 121, webs 11 and 101 unite as they are pulled over roller 125 and then pass through an optional solidification chamber 130, where the electrolyte may solidify if desired, but should preferably remain tacky.

A spool of foil 71 with terminals 80 is provided above web 101, which extends down through rollers 150 and 151 where the foil 71 is cut into anode leaves 85 by optional cutter 165, which may be a laser cutter. The anode leaves 85 are placed in spaced relation on top of web 101 and the combination passes between an optional squeegee mechanism which is a pair of soft squeegee rollers 155, a belt 166, release tape 156, rollers 160 and spool 157, which presses the anode leaves 85 onto coated web 101.

The roll of release paper or tape 156 may be fed on top of anode leaves 85 prior to rollers 155 and is removed by winding onto spool. 157 after the combination passes a second set of rollers 160 and belt 166. All components of the described mechanism are speed synchronized with the combination.

If the optional squeegee mechanism is omitted, then the anode leaves 85 should be fed in spaced relation into nip rollers 170, and between the electrolyte coated webs 101 and 101A.

In a mirror image, a second spool 100A of insulating plastic net web 101A is provided, to the right in FIG. 8, which is pulled through a second dip tank 105A which is filled with polymer electrolyte 106A in liquid state. A second spool 53A with a second cathode coated web 11A is provided which has unmasked terminals 20 thereon, and may also be moistened as described and which joins the web 101A from underneath, after tank 105A, and they are pulled over a second roller 125A.

An optional spool of second adhesive plastic tape 121A, with release paper or tape 123A, may be provided, which tapes are wider than the webs 11, 11A, 101, and 101A, and foil 71, and tape 121A is fed from the bottom underneath roller 125A, under web 11A. The tape 121A, webs 11A and 101A pass through an optional solidification chamber 130A over roller 125A and down on top of anode leaves 85, which pass through driven nip rollers 170, which press the top tape 121A, webs 11A and 101A, leaf anodes 85, webs 11 and 101 and bottom tape 121 together in preferably synchronized relation to form a bi-cell assembly. The layered assembly may be optionally and preferably cut by cutter station 140, which may contain a laser cutter, between the anode leaves 85 to prevent shorting of the cells, as shown in FIG. 9, to form individual bi-cells 175, which are fed between rollers 176 and 177, picked up by a vacuum arm (not shown), and stacked and packaged as described for single cells, or deposited into a receiving bin 180.

If the layered assembly is not cut into cells, it may be optionally rolled into a "jelly roll" cell or cells by a winding device (not shown) and sealed as described for single cells.

It should be apparent that similarly, additional layers may be inserted or added as desired to form bi-polar electrochemical devices.

Referring now more particularly to FIG. 11, the apparatus shown therein is similar to FIG. 1 except that better control of the deposition of the anode leafs is attained to prevent accumulation of lengthwise errors and misalignment of electrodes. A spool 70 of anode material 71 with terminals 80 attached thereto is fed between rollers 183 into a cutter 182 and cut into leafs 85. The leafs 85 are fed between rollers 184. The leafs 85 are engaged by a length of adhesive tape 86 from roll 181, whose release paper 95 passes over roller 131 and is taken up by spool 132.

The leafs 85 and tape 86 are fed into rollers 134 in synchronized manner, which forces them into contact with web 101, after which they are engaged by a second pair of rollers 135, which deliver the layered assembly into a cutter station 140 for cutting as described above.

Figure 12:
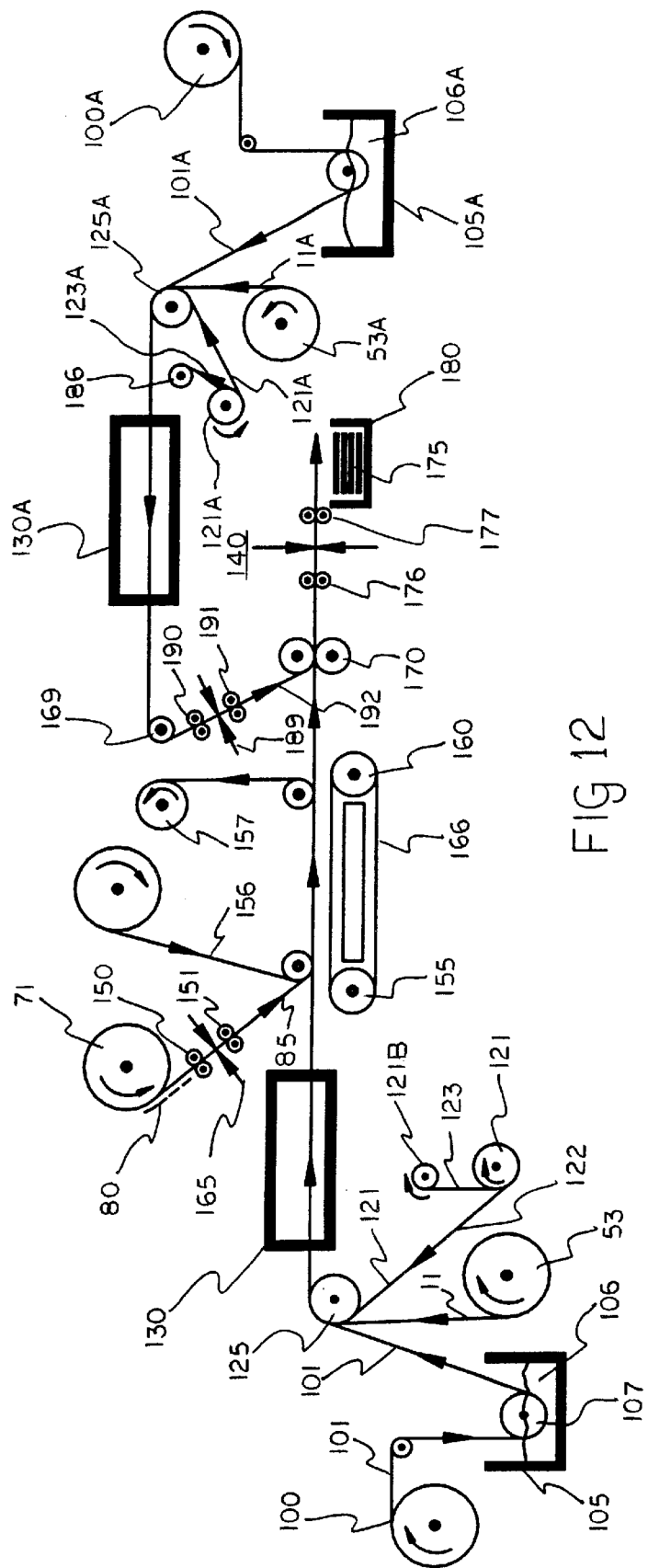
FIG. 12 is a view similar to FIG. 8 and which has an additional cutter.

Referring now more particularly to FIG. 12 which is similar to FIG. 8, as described above, except that the net web 101A with cathode 53A and tape 121A after it passes over roller 169 is passed between spool shaped driven rollers 190 at a cutter station 189, which is preparably a laser cutter, which cuts the electrolyte web 101A, cathode web 11A, and tape 121A "on the fly," during transport, into leafs 192 which pass through spool shaped driven rollers 191 and are laid down onto leafs 85 carried on web 101. The tape 121A has adhesive in the center only, which is the same width as cathode web 11A. The rollers 190 and 191 nip only the wider tape, and in this case the tape 121A with non-adhesive edge strips, to prevent sticking. The electrolyte coated web 101A is laid down on top of the anode leafs 85, with cathode leafs 192 laid on top thereof in synchronized manner and in alignment therewith.

Similarly, the cutter station 189 may be also inserted into FIG. 1 or FIG. 14, the tape 86 may be replaced by tape 121A and the tape may be cut between the anode or cathode leafs.

Referring now more particularly to FIG. 13, which illustrates an apparatus for cathode manufacture wherein the cathode coated web 11, with attached terminals 20, is carried by rollers 81 to and passes between an optional cutter assembly 82, which may contain a laser cutter, where it engages rollers 81A, which assembly 82 then cuts the web into cathode leafs 200 between terminals 20, which are then deposited on a length of adhesive tape 86, which should be wider than web 11. The tape 86 is fed from a roll 87 carried on a spool 88 underneath the cathode leafs 200. The adhesive tape 86 has a length of release paper 90 removed therefrom so that as spool 88 unwinds the adhesive side 91 faces upwardly to receive and retain the cathode leafs 200.

A spool of release paper or tape 95 is carried on a spool 96 above the cathode leafs 200, and below roller 93 where it is pressed on top of cathode leafs 200 with both tapes being taken up by a driven spool 201 about which they are wound.

Referring now to FIG. 13A which illustrates the attachment of terminals to anode material, a spool 70 with anode foil 71 thereon, has the foil 71 engaged by a pair of rollers 72 which feed it into a terminal attaching station 75 where terminals 80 are fed by well known means into the station 75 where they are attached by pressing to cold solder the terminals to the foil 71.

The foil 71, with attached terminals 80, is fed onto a driven spool 202 about which they are wound.

Referring now more particularly to FIGS. 14, 15 and 16, which illustrates a single cell reverse apparatus and the resultant product, the apparatus includes a spool 100 with a net web of insulating plastic 101 wound thereon in a box (not shown) which can be an extension of box 27 described above, or a separate box (not shown). The spool shaft 102 is engaged in a frame (not shown) for controlled unwinding. The web 11 from spool 100 extends down over roller 103 with its shaft 104 carried in a frame (not shown) and down into a dip tank 105 which is filled with a polymer electrolyte 106 in liquid state, which may be a hot melt. The web 101 extends under roller 107 on shaft 108, carried by tank 105, and travels upwardly between partially submerged optional wipe rollers 109 which control the thickness of the electrolyte on the web 101, and the web 101 is coated and encapsulated by the electrolyte.

The dip tank 105 may be connected by pipe 115 to a supply reservoir 116 of electrolyte to maintain the proper temperature and level of electrolyte.

The anode spool 202 with anode foil 71 and attached terminals 80 is also located in the assembly apparatus. The foil 71 is unrolled from spool 202 and travels around rollers 124A, 124B and 124C and upwardly between rollers 120, where an adhesive plastic tape 121 is joined thereto. The tape 121 has an adhesive covered side 122 which faces the foil 71 and the tape is wider than the anode foil 71 and electrolyte web 101. The adhesive may also be a polymer electrolyte. The adhesive tape 121 may also have a release paper or tape thereon which unwinds (not shown).

The electrolyte web 11 is engaged from underneath by the foil 71 and both extend over a preferably large diameter roller 125 where they are forced together by tension forces in the foil 71, and web 101. The foil 71 and web 101 then travel through an optional solidification chamber 130 of well known type, such as a cooling or radiation cross linking chamber where the liquids solidify, but remain tacky. Any vaporized solvent from the electrolyte may be collected in a similar condenser, as described for cathode coating (not shown).

The web 11 with cathode leafs 200 on spool 201 which may be the same width as tape 121 is unwound from spool 201, and laid down on top of the web 101. As the foil unwinds, the release paper 95 is unwound, extends over roller 131 and is taken up by spool 132, exposing the adhesive portion of tape 86 which faces the web 11. The tape 86, webs 11 and 101 pass in preferably synchronized relation between a pair of soft squeegee rollers 134, which assemble them by pressure, after which they are engaged by a second pair of rollers 135 which deliver the layered assembly to an optional cutter station 140 for cutting, if desired. The cutter station 140 may include one or more blades 141, which are preferably of plastic or ceramic composition, or the station 140 may contain a laser cutter (not shown).

The blades 141 cut the layer assembly preferably between the cathode leafs 200 to prevent shorting, and to form individual cells 145 as shown in FIGS. 15 and 16. The cells 145 may be preferably picked up by a vacuum arm (not shown) of well known type, stacked with terminals connected as required, placed into a heat sealable metal foil bag coated with plastic (not shown) which is heat sealed, and then placed in a hard container (not shown) for puncture protection.

Referring now more particularly to FIGS. 15, 16, which illustrate a final reversed single cell product 145, which includes a portion of carrier tape 86 in contact with a cathode leaf 200, in contact with a portion of electrolyte coated web 101, in contact with an anode leaf 71 and in contact with a tape portion 121, forming the cell. The cathode leaf 200 has terminals 20 thereon, and the anode leaf 71 has terminals 80 thereon.

Referring now particularly to FIG. 17 a reverse bicell apparatus for carrying out the reverse method is illustrated.

The apparatus, referring to the left side thereof, is similar to the apparatus of FIG. 8, and a spool 100 of net web 101 of insulating plastic is shown, which extends over roller 107 into dip tank 105, which is filled with polymer electrolyte in liquid state. A spool of anode foil 71A is provided which has terminals 80 thereon, and is carried on a layer of bottom plastic tape 121, which extends up over roller 125 with the web 101 on top thereof, and which extend through an optional solidification chamber 130 where the electrolyte may solidify if desired, but should preferably remain tacky. A spool 53 is provided above chamber 130 with a cathode coated web 11, which has unmasked terminals 20 thereon, and which may also be pre-moistened as described above. The web 11 is gripped by rollers 190A at cutter station 189A, which is preferably a laser cutter, which cuts the cathode web 11 into cathode leafs 192A which are deposited in synchronized manner on top of electrolyte coated web 101, and spaced in aligned relationship with terminals 80.

As illustrated at the right in FIG. 17, a second spool of foil 71A is provided with terminals 80 with a length of plastic tape 121A thereon which extends up over roller 125A where a web 101A of insulating plastic that has been coated with electrolyte 106A in tank 105A is laid on top of the anode foil 71.

The combination unites and passes through solidification chamber 130A where the electrolyte may solidify, but preferably should remain tacky. The combination passes over roller 169A and is laid on top of cathode leafs 192A as they exit cutter station 189A, and then pass between rollers 155 where they are pressed together, and pass through rollers 176 of cutter station 140, where they are cut between the cathode leafs to form cells 175, which pass through rollers 177 and are deposited into a bin 180.

The final reversed bi-cell 175 is shown in FIG. 18 with tape 121A on top in contact with second anode 71A and electrolyte web 101A, which is in contact with cathode leaf 192A which is in contact with web 101, which is in contact with first anode 71A on top of bottom tape 121, forming the bi-cell. Terminals 20 are provided on cathode leaf 192A and terminals 80 on anodes 71A.

Similarly, this reversed bi-cell method may also optionally have a cutter added to cut the second anodes, top tape and the second electrolyte web in synchronized manner into leafs as described above to prevent accumulation of tolerances and misalignment of electrodes.

The described apparatus and methods may also be used for liquid electrolyte batteries, fuel cells, capacitors and other electrochemical devices, in which the polymer electrolyte is replaced by a liquid electrolyte and the net webs 101 and 101A are replaced by separator webs, preferably of porous plastic membrane, and solidification chambers 13 and 13A are omitted.

Accordingly, methods have been described with which the objects of the invention are achieved.

What is claimed is:

1. A method of automatic mass production and packaging of a plurality of single cell electrochemical devices which comprises providing a length of cathode coated current collector material with spaced terminals thereon, providing a length of first adhesive plastic tape with first release tape thereon, removing said first release tape, joining said first adhesive plastic tape to said cathode material in overlying relation, providing a length of insulating net, coating said net with liquid electrolyte, assembling said coated net, said cathode material and said first adhesive tape, curing said electrolyte coating, providing a length of anode material with spaced terminals thereon, cutting said length of anode material into anode leafs, with said terminals thereon, assembling said anode leafs onto said coated net in spaced and synchronized manner, providing a length of second adhesive plastic tape with second release tape thereon, removing said second release tape, joining together by pressure said cathode length, said first adhesive tape, said electrolyte coated net, said anode material leafs and said second adhesive tape into a layered assembly with said second adhesive tape in overlying relation, with said electrolyte coated net between said anode leafs and cathode length, and with said adhesive tapes on the outside of said cell, wherein said cathode length, said electrolyte coated net and said anode leafs are assembled in synchronized relation, cutting said layered assembly between said anode leafs to form individual cells, and stacking and packaging said cells.

2. A method of automatic mass production and packaging of a plurality of single cell electrochemical devices with comprises providing a length of anode material with spaced terminals thereon, providing a length of first adhesive plastic tape with first release tape thereon, removing said first release tape, joining said first adhesive plastic tape to said anode material in overlying relation, providing a length of insulating net, coating said net with liquid electrolyte, assembling said coated net, said anode material, and said first adhesive tape, curing said electrolyte coating, providing a first length of cathode coated current collector material with spaced terminals thereon, cutting said length of cathode material into cathode leafs, with said terminals thereon, assembling said cathode leafs onto said coated net in spaced and synchronized manner, providing a length of second adhesive plastic tape with second release tape thereon, removing said second release tape, joining together said anode coated length, said first adhesive tape, said electrolyte coated net and said cathode material leafs, and said second adhesive tape into a layered assembly by pressure with said second adhesive tape in overlying relation, with said electrolyte coated net between said anode length and cathode leafs, and with said adhesive tapes on the outside of said cell, wherein said anode length, said electrolyte coated net and said cathode leafs are assembled in synchronized relation, cutting said layered assembly between said cathode leafs to form individual cells, and stacking and packaging said cells.

3. A method of automatic mass production and packaging of a plurality of bi-cell electrochemical devices which comprises providing a first length of cathode coated current collector material with spaced terminals thereon, providing a length of first adhesive plastic tape with first release tape thereon, removing said first release tape, joining said first adhesive tape to said cathode material in overlying relation, providing a first length of insulating net, coating said net with liquid electrolyte, assembling said first coated net, said first cathode material and said first adhesive tape, curing said electrolyte coating, providing a length of anode material with spaced terminals thereon, cutting said length of anode material into anode leafs, with said terminals thereon, assembling said anode leafs onto said first coated net in spaced and synchronized manner, providing a second length of cathode coated current collector material with spaced terminals thereon, providing a length of second adhesive plastic tape with second release tape thereon, removing said second release tape, joining together said second length of cathode material with said second adhesive plastic tape, providing a second length of insulating net, coating said second net with liquid electrolyte, assembling said second coated net onto said second cathode material and said second adhesive plastic tape, with said second cathode material facing said second coated net to form a second assembly, flipping said second assembly upside down, cutting said length of said second assembly material into second assembly leafs, with said terminals thereon, assembling said second assembly leafs onto said first coated net in spaced and synchronized manner, with said second coated net facing said anode leafs, joining said first cathode length, said electrolyte coated nets, said anode material leafs, said second cathode leafs and said adhesive plastic tapes into a layered assembly, by pressure, with said electrolyte coated nets between said anode leafs, said first cathode lengths, and said second cathode leafs and said adhesive tapes on the outside of said bi-cell, wherein said first cathode lengths, said electrolyte coated nets, said anode leafs and said second cathode leafs are assembled in synchronized relation, cutting said layered assembly between said anode leafs to form individual bi-cells, and stacking and packaging said bi-cells.

4. A method of automatic mass production and packaging of a plurality of bi-cell electrochemical devices which comprises proving a first length of anode material with spaced terminals thereon, providing a length of first adhesive plastic tape with first release tape thereon, removing said first release tape, joining said first adhesive tape to said anode material in overlying relation, providing a first length of insulating net, coating said net with liquid electrolyte, assembling said first coated net, said first anode material and said first adhesive tape, curing said electrolyte coating, providing a length of cathode coated current collector material with spaced terminals thereon, cutting said length of cathode material into cathode leafs, with said terminals thereon, assembling said cathode leafs onto said first coated net in spaced and synchronized manner, providing a second length of anode coated current collector material with spaced terminals thereon, providing a length of second plastic adhesive tape with second release tape thereon, removing said second release tape, joining together said second length of anode material with said second adhesive plastic tape, providing a second length of insulating net, coating said second net with liquid electrolyte, assembling said second coated net onto said second anode material and said second adhesive plastic tape, with said second anode material facing said second coated net to form a second assembly, flipping said second assembly upside down, cutting said length of said second assembly material into second assembly leafs, with said terminals thereon, assembling said second assembly onto said first coated net in spaced and synchronized manner, with said second coated net facing said cathode leafs, joining said first anode length, said electrolyte coated nets, said cathode material leafs and second anode leafs and said adhesive plastic tapes into a layered assembly, by pressure, with said electrolyte coated nets between said cathode leafs, said first anode lengths and said second anode leafs, and said adhesive tapes on the outside of said bi-cell, wherein said first lengths, said electrolyte coated nets, said cathode leafs and said second anode leafs are assembled in synchronized relation, cutting said layered assembly between said cathode leafs to form individual bi-cells, and stacking and packaging said bi-cells.

5. A method of automatic mass production and packaging of electrochemical devices as defined in claims 1, or 2, or 3, or 4, in which said cutting step comprises the use of a laser cutter.

6. A method of automatic mass production and packaging of electrochemical devices as defined in claims 1 or 2, or 3 or 4 which comprises the additional step of inserting or adding additional layers of electrolyte, cathode and anode to form bi-polar electrochemical devices.

7. A method of automatic mass production and packaging of electrochemical devices as defined in claims 1 or 2, or 3 or 4 which can be used for the production of capacitors.

8. A method of automatic mass production and packaging of electrochemical devices as defined in claims 1 or 2 or 3 or 4 which comprises the additional step of heat sealing said adhesive tapes.

* * * * *

UNITED STATES PATENT AND TRADEMARK OFFICE
CERTIFICATE OF CORRECTION

PATENT NO. : 6,134,773
DATED : October 24, 2000
INVENTOR(S) : Joseph B. Kejha

It is certified that error appears in the above-identified patent and that said Letters Patent is hereby corrected as shown below:

<u>In the Abstract</u>
In the third line from the bottom of the Abstract, change "or" to --of--.

<u>In the Drawings</u>
In Figure 11, change "71" to --70-- and "70" to --71--.

Col. 1, lns. 32 - 34; delete "This invention also relates to a similar but extended methods for automatic mass production of bi-cells or bi-polar batteries where the top adhesive is omitted and".

Col. 7, ln. 42; change "option al" to --optional--.

<u>In the Claims</u>
Col. 12, ln.13; change "with" to --which--.

Signed and Sealed this

Twenty-second Day of May, 2001

Attest:

NICHOLAS P. GODICI

Attesting Officer    Acting Director of the United States Patent and Trademark Office